United States Patent [19]

Urkowitz et al.

[11] Patent Number: 4,809,001
[45] Date of Patent: Feb. 28, 1989

[54] LAND MASS BLANKING APPARATUS (U)

[75] Inventors: Harry Urkowitz, Philadelphia, Pa.; Richard P. Perry, Haddon Heights, N.J.

[73] Assignee: United States of America as represented by the Secretary of the Navy

[21] Appl. No.: 589,659

[22] Filed: Jun. 20, 1975

[51] Int. Cl.$^4$ ............................................. G01S 7/30
[52] U.S. Cl. ...................................... 342/94; 342/159
[58] Field of Search ............ 343/5 VQ, 5 SA; 342/91, 342/94, 159

[56] References Cited

U.S. PATENT DOCUMENTS

| | | | |
|---|---|---|---|
| 2,668,286 | 2/1954 | White | 343/7.7 |
| 3,149,333 | 9/1964 | Campbell | 343/5 VQ |
| 3,353,177 | 11/1967 | Welmot | 343/5 VQ |
| 3,680,095 | 7/1972 | Evans | 343/5 VQ |
| 3,718,929 | 2/1973 | Van Horn | 343/5 SA X |
| 3,725,928 | 4/1973 | Klimchak | 343/5 SA |
| 3,727,215 | 4/1973 | Welmot | 343/5 VQ |

Primary Examiner—Theodore M. Blum
Assistant Examiner—Gilberto Barrón, Jr.
Attorney, Agent, or Firm—J. M. St. Amand

[57] ABSTRACT

Conventionally, a shift register receives radar video return signals and gates them into a signal processing and detecting means. Since continuous, large cross-section echoes such as those derived from land masses may saturate the processor, the present apparatus is set to blank such land masses. For this purpose, the shift register capacity is made coextensive with the continuous land mass echo and further, the register is provided with a series of taps spaced one from the other a distance representing selected increments of the range extent being tested. Each tap output is applied to an amplitude-thresholder to pass only higher strength echoes to a counter. Count-responsive means operating as a counter threshold control the radar signal processor to the extent that when the total count exceeds a certain number a processor "shut-off" signal is generated. When the count goes below the certain number a "turn-on" signal is generated. Thus, the processor is inactive when the count receives a predetermined total indicator of the large land mass to be blanked.

6 Claims, 1 Drawing Sheet

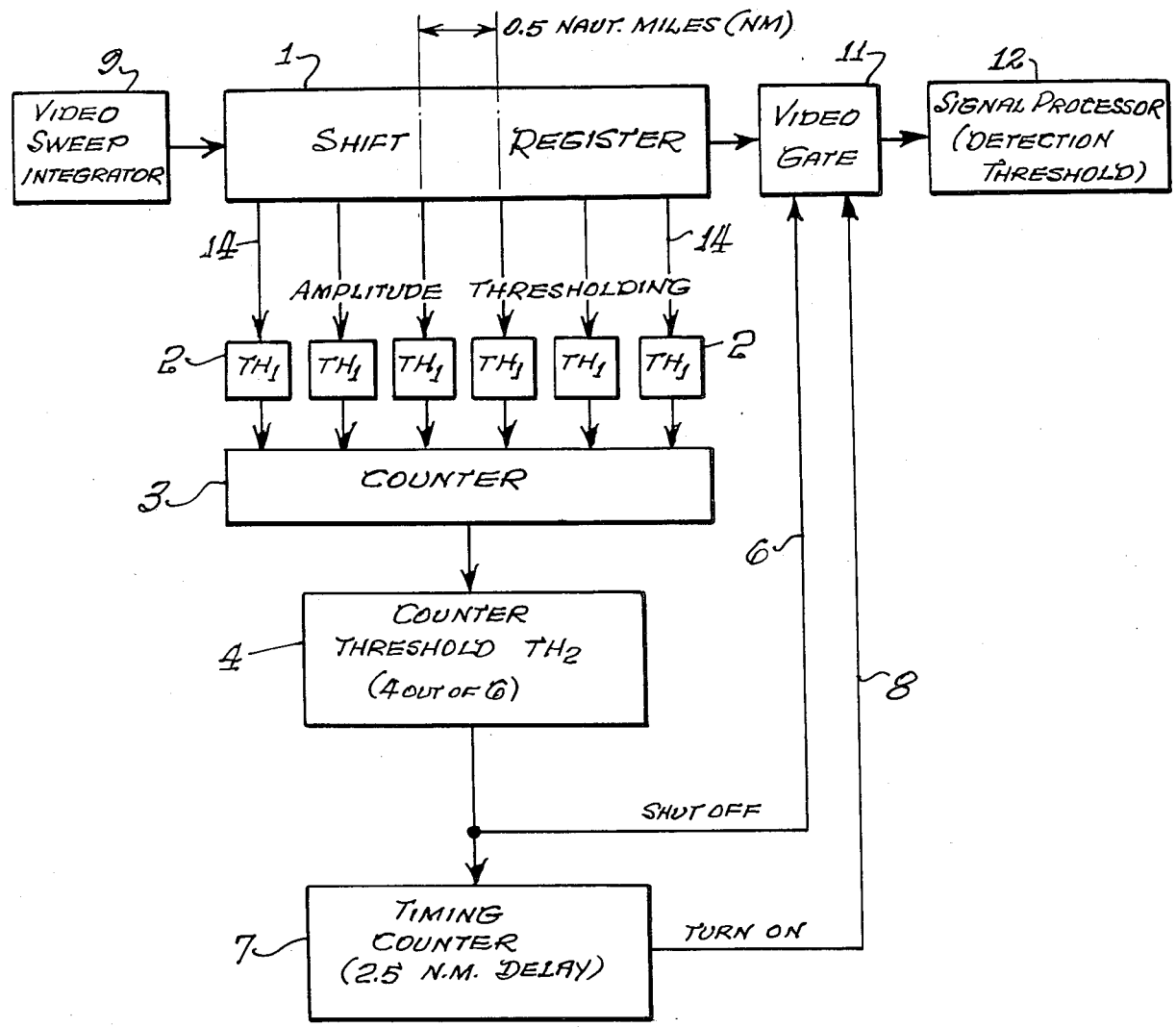

LAND MASS BLANKING APPARATUS (U)

BACKGROUND OF THE INVENTION

The invention relates to surveillance radar and the like, and, in particular, to means for controlling the number or rate of target reports applied to the signal processor of such a radar.

Surveillance radars frequently are used to detect targets on or over ocean surfaces and, for such purposes, may be ship-borne, air-borne or carried by a satellite. In such radars it is important to control the number or rate of target reports applied to its signal processor which, as is known, may operate as a threshold detector. One difficulty, however, is the fact that an excessive number of target reports saturates the signal processor. In particular, radar echoes from land, since they are of a relatively large cross section, frequently exceed the systems detection threshold and are reported as targets. Consequently, when operating near land, it is necessary to have some means of preventing the and echoes from reaching the signal processor and, of course, it is highly desirable to provide this means in a simple, inexpensive, straightforward and reliable manner.

It is, therefore, an important object of the invention to provide a simple and reliable land mass blanking circuit to prevent land echoes from reaching the signal processor of a surveillance-type radar.

More generally considered, an object of the invention is to provide range-responsive apparatus for selectively blanking the application of a series of relatively high strength video return signals to a gated radar signal processor.

Other specific objects will become apparent in the ensuing description.

BRIEF DESCRIPTION OF THE DRAWINGS

One embodiment of the invention is illustrated in the accompanying drawing which is a schematic block diagram illustrating the present land mass blanking circuit.

DETAILED DESCRIPTION OF THE INVENTION

The illustrated embodiment is intended to function as a land mass blanker although, obviously, the blanking technique can be applied to a variety of targets. In particular, the circuit shown in the drawing determines first, whether a radar echo comes from a high radar cross-section and, second, whether the echo is range extensive. If these two conditions are met, the echo can be assumed to come from a land mass and the video, consequently, can be blanked to prevent it from reaching the detection threshold. When these conditions no longer are met, the blanking circuit does not block the video signal and it is applied in the normal manner to the detection threshold.

Referring to the drawing, major components of the present invention can be identified as a shift register 1, a plurality of the amplitude thresholding components 2, a counter 3 and a video gate controlling means which, itself, includes a counter threshold component 4 adapted to apply a video gate "shut-off" signal to line 6 and another counter 7 functioning as a timing counter to apply a "turn-on" signal to line 8. Lines 6 and 8 apply the "shut-off" and "turn-on" signals to the video gate of a signal processor.

The input to shift register 1 of the land mass blander is the output of a video sweep integrator 9 which is considered as part of the surveillance radar for which the blanking circuit is adapted. Integrator 9 normally is employed to enhance target echoes over noise and sea clutter, although, as will be recognized, such a sweep integrator is not essential to the land mass blanker if the target echo is sufficiently large compared to the noise and sea clutter. Also, as will be apparent, the present circuit presumes that the video signal is in digital form so that shift register 1 can function as a tapped delay line. However, the circuit easily can be modified to accommodated analog inputs in which event the component of the circuit can be implemented by simple and well-known electronic devices.

Video return signals applied to shift register 1 are advanced though the register at a controlled rate with the register output being coupled in the usual manner to a video gate, identified as gate 11 which in turn leads to a signal processor, such as a detection threshold device 12. Video gate 11 and signal processor 12, however, also can be considered as components of the radar system for which the blanking circuit is adapted rather than as an integral part of the circuit itself.

One feature of the present invention is the fact that shift register 1 is of a fixed length or capacity so as to represent a particular range extend for which the blanking circuit of the invention is designed. In other words, if the present blanking circuit is designed to blank land masses having a range extend of 2.5 nautical miles, the shift register is of such a length and if advances incoming signals at such a rate that the time interval required for completely filling the register equals the time span required for receipt by the register of a continuous return signal from a land mass of 2.5 nautical miles range extent. Consequently, when a range extent of 2.5 nautical miles is illuminated by the radar beam, the video return completely fills the shift register. As will be seen this characteristic permits land mass signals of such an extent to be blanked from signal processor 12. Of course, the same applies if the range extend exceeds 2.5 miles.

To achieve the blanking, shift register 1 is formed with a plurality of taps 14 so that, in effect, the register acts as a tapped delay line. As shown in the drawing, the taps are set 0.5 nautical miles apart and the total number of taps, which is six, corresponds to the range extent being tested for the presence of continuous echo which, as illustrated, is a total range extent of 2.5 nautical miles. More generally considered, the taps are arranged in a spaced relationship to provide signal outputs spaced to provide outputs for predetermined increments of the total range. Obviously, the fixed capacity of the register as well as the number of taps can be varied. For example, a one nautical mile range extent might be considered appropriate and, in such a case, if the system range resolution is 500 feet, a suitable arrangement would utilize taps spaced about 1,000 feet apart. In this instance, there would be 7 taps. It should be noted that the spacing between taps is substantially larger than the size of a range increment as determined by the systems range resolution. In practice a spacing equal to about twice this resolution is preferred. Obviously, if the spacing were fixed at the resolution range of the system or if the spacing were less than this resolution range, an undesirable ambiguity would be introduced.

The range increment signals present in output taps 14 are applied to amplitude thresholding components 2 identified in the drawing as components $TH_1$ which, in the implementation of the circuit, can be provided in any of a variety of well-known manners which are capable of filtering out background noise such as environmental noise or sea clutter and of passing to counter 3 so-called 'exceedance' signals. Such 'exceedance' signals, obviously, are higher strength signals having a large radar cross section such as is derived from illuminated land mass targets. If the input is a digital signal from a video sweet integrator such as integrator 9, the threshold components also are digital. On the other hand, if the system operates in an analog manner, thresholding components 2 can be provided in a very simple manner by the use of simple triodes provided with appropriate negative bias.

Functionally, counter 3 provides a vital part of the present circuit in that the blanking operation is made entirely dependent upon the instantaneous count of this component. For example, if 4 out of 6 of thresholds 2 are exceeded, the echo can be presummed to be a land echo and a "shut-off" signal then applied to video gate 11. Obviously, when gate 11 is shut off, the output of shift register 1 to the gate cannot proceed to the signal processor and, the video signal then is "blanked-out". The 4 out of 6 figure, of course, represents an arbitrary value which can be increased or decreased depending upon the particular test needs. To permit the blanking of video gate 11, a counter threshold component 4 identified as $TH_2$, is employed. Component 4 functions to receive the total count of counter 3 and to subject the count to a logic which dictates the generation of the "shut-off" signal. However, if the count is less than 4, no "shut-off" is generated and instead, the count is passed to timing counter 7 which, initiates a video gate "turn-on" signal to reopen video gate 11. However, to assure that no more land echo signal is present in the register when the ate is reopened, counter 7 operates as a delay to turn on the video signal 2.5 nautical miles after counter threshold 4 initially indicates a count of less than 4 out of 6. Again, the delay period is arbitrary and will depend upon the predetermined range extent being tested, although, some delay to clear shift register 1 certainly is desirable to avoid ambiguities.

In summary, the present blanking circuits simply provides a storage or register means having an appropriate signal capacity coordinated with the range extent to the blanked and, by tapping this register at appropriate range extent increments, a series of exceedance signals is produced and counted. Depending upon the count, the video gate which receives the output of shift register 1 either is blanked or it may remain open. If blanked, a lower count subsequently received will reopen the gate for normal operation after an appropriate time delay. In this manner, the number of rate of target reports applied to the signal processor is controlled at least to the extent that radar echoes from large land masses will not exceed the systems detection threshold. The advantage of the circuit lies primarily in its functional importance to the radar system as a whole. Additionally, as will be recognized, the circuit can be implemented in a unusually inexpensive and reliable manner using well-known and readily-available components.

The primary use of the circuit is to blank land masses from the signal processor of an air-borne, ship-borne or satellite surveillance-type radar as it sweeps over both sea and land. Other applications, however, are contemplated and, other radars can use the principles which have been described. As also should be recognized, there may be situations in which the blanking circuit operates in a reverse manner to the extent that blanking is achieved in the present to of a relatively low number of exceedance signals and normal operations resumed when these signals are high.

Obviously, many modifications and variations of the present invention are possible in the light of the above teachings. It is therefore to be understood that within the scope of the appended claims the invention may abe practiced otherwise than as specifically described.

I claim:

1. Range-responsive apparatus for selectively blanking the application of a series of relatively high strength video return signals to a gate radar signal processor comprising:

shift register means having an input continuously receiving said radar return signals and an output, said register having a particular input-to-output capacity and a particular rate of advancing said return signals from said input to said output, said capacity and said advance rate being fixed in accordance with the time interval required to fill the register to capacity with a series of signals derived from a predetermined radar range extent; and said register further being provided with a plurality of taps disposed with regard to said rate of advance to provide a series of tapped outputs for signals received from fixed increments of said predetermined range extent, means coupling said register output to said signal processor gate, amplitude threshold means for each of said tapped outputs, counting means coupled to said threshold means, and count-responsive means for controlling said radar signal processor gate, said amplitude threshold means being set to responds to the presence of signal inputs having a strength exceeding a particular predetermined background noise level for generating exceedance signals applied to and counted by said counting means; and said count-responsive means being responsive to said count for generating a gate "shut-off" signal when said count reaches a particular number and also for initiating a gate 'turn-on' signal when said count does not reach said number, whereby said signal processor is blanked when a series of high-strength radar return signals produces a particular count.

2. The apparatus of claim 1 wherein said count-responsive control means further includes:

means for delaying the generation of said gate 'turn-on' signal for a period of time sufficient to clear said register of the series of signals which initiate the 'turn-on' signal.

3. The apparatus of claim 1 wherein said video return signals are advanced through said register at a constant rate and said register taps are equally spaced.

4. The apparatus of claim 1 wherein said radar is a surveillance radar adapted to selectively blank a land mass of a predetermined range extent, said threshold means each being set to pass radar signals derived from land targets and to block background noise signals.

5. The apparatus of claim 4 wherein said register taps are spaced equidistantly to provide outputs for range increments substantially greater than the range resolution of the radar.

6. The apparatus of claim 5 wherein said spacing is equal to about twice the resolution of the radar.

* * * * *